US006722447B2

United States Patent
Stepan et al.

(10) Patent No.: US 6,722,447 B2
(45) Date of Patent: Apr. 20, 2004

(54) CONCENTRIC PNEUMATIC/HYDRAULIC POWER FEED APPARATUS

(75) Inventors: Michael M. Stepan, Langley, WA (US); Roger A. Gage, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/136,812

(22) Filed: May 1, 2002

(65) Prior Publication Data

US 2003/0205394 A1 Nov. 6, 2003

(51) Int. Cl.[7] .................................................. E21B 7/00
(52) U.S. Cl. ................. 173/1; 173/4; 173/152; 408/97; 408/130
(58) Field of Search .................... 408/97, 112, 130; 173/1, 4, 152

(56) References Cited

U.S. PATENT DOCUMENTS

| 2,375,112 | A | * | 5/1945 | Kanihan | 408/84 |
| 2,657,595 | A | * | 11/1953 | Shaff | 408/130 |
| 3,389,413 | A | * | 6/1968 | Van Den Kieboom | 408/130 |
| 3,677,351 | A | | 7/1972 | Geissler | |
| 3,773,117 | A | * | 11/1973 | Dussel | 173/4 |
| 4,288,182 | A | * | 9/1981 | Vandenkieboom et al. | 408/129 |
| 4,867,617 | A | * | 9/1989 | Maass et al. | 408/17 |
| 5,295,770 | A | * | 3/1994 | Pennison et al. | 408/6 |
| 5,833,404 | A | * | 11/1998 | Johnson et al. | 408/130 |

FOREIGN PATENT DOCUMENTS

| DE | 11 69 642 | 5/1964 |
| DE | 4 416 994 | 11/1995 |
| DE | 201 15 251 U | 11/2001 |
| EP | 0 027 951 | 5/1981 |
| EP | 0 286 710 | 10/1988 |
| FR | 1 441 746 | 6/1966 |
| FR | 1 469 870 | 2/1967 |
| GB | 1 306 046 | 2/1973 |
| GB | 0 482 672 | 8/1977 |

OTHER PUBLICATIONS

Doler Machines, P3 Drill with Concentric Collet, p. 76.

* cited by examiner

Primary Examiner—Scott A. Smith
Assistant Examiner—Chukwurah Nathaniel
(74) Attorney, Agent, or Firm—Harness Dickey & Pierce P.L.C.

(57) ABSTRACT

A power feed apparatus for applying a thrust force to an output shaft of a motor driven tool to drive the output shaft linearly towards and away from a workpiece without applying off-axis forces to the output shaft that would cause it to move out of perfect perpendicular alignment to the outer surface of the workpiece. The apparatus includes a first tubular member which is fixedly secured to a jig or other like mounting structure associated with the workpiece. A second tubular member is disposed for sliding linear movement along the first tubular member. Spaced apart annular fluid chambers are formed within the apparatus along with associated fluid ports for allowing a pressurized fluid to be used to both extend and retract the output shaft of the tool. The tool itself is supported on the second tubular member and thus moves linearly along with the second tubular member.

17 Claims, 3 Drawing Sheets

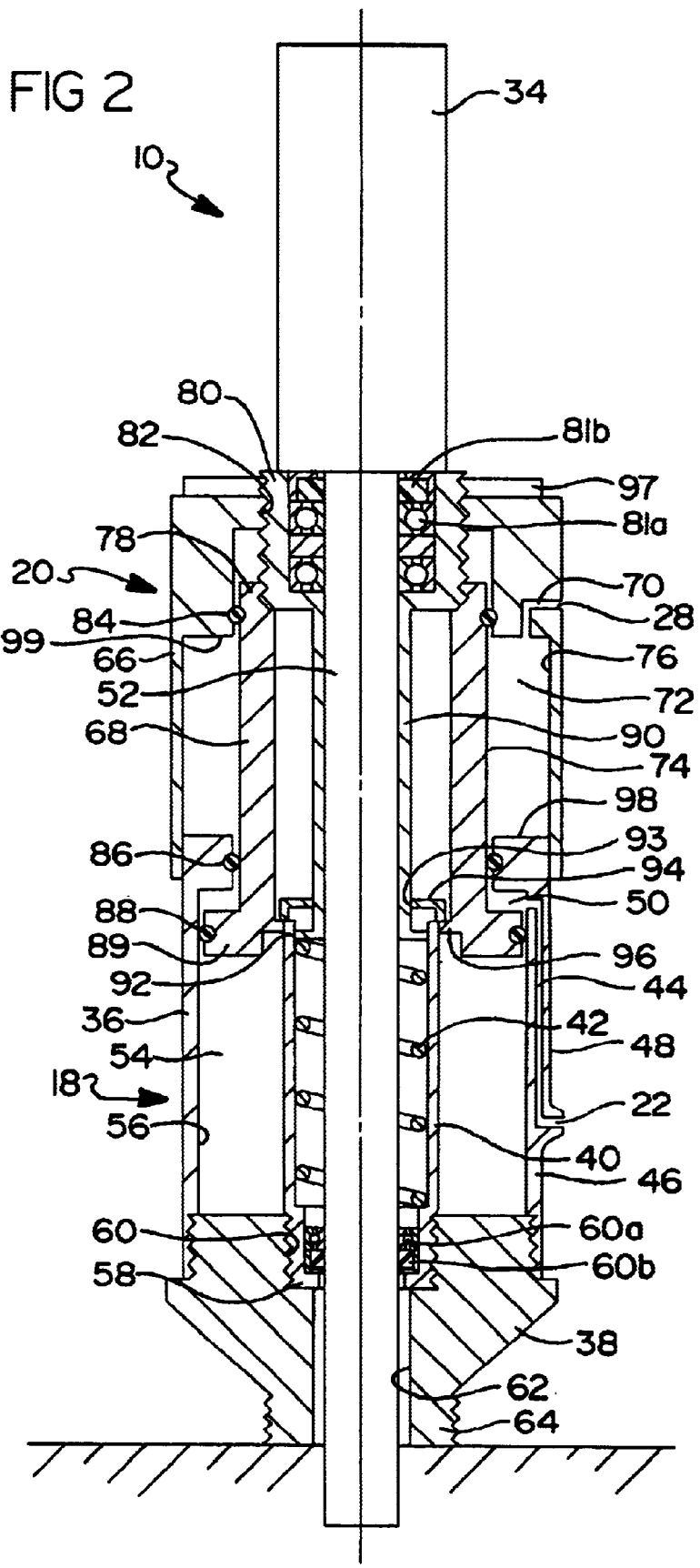

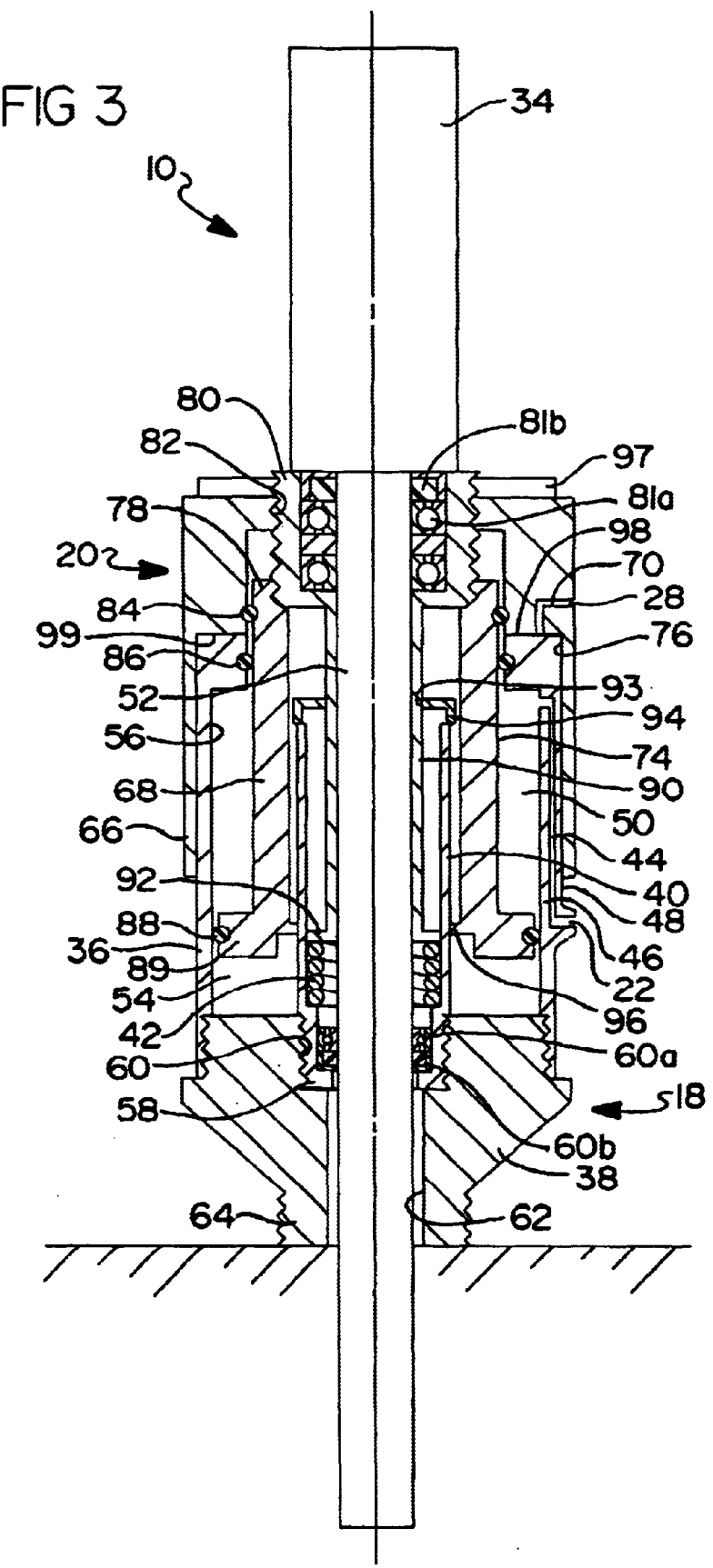

CONCENTRIC PNEUMATIC/HYDRAULIC POWER FEED APPARATUS

FIELD OF THE INVENTION

This invention relates to pneumatic/hydraulic power tools, and more particularly to a pressurized fluid driven power feed apparatus for concentrically applying thrust forces to an output shaft of a tool in a manner which distributes the thrust forces evenly concentrically about the output shaft.

BACKGROUND OF THE INVENTION

In aircraft assembly operations, it is often necessity to clamp or otherwise attach a hand operated drill style reamer onto a spar or other area of a workpiece so that the reamer can be automatically operated. This has involved incorporating a pneumatic/hydraulic cylinder attached to some form of carriage, which is in turn coupled to the power tool that is performing the machining operation, whether it be drilling, cutting or reaming. As such, the pneumatic/hydraulic cylinder is laterally offset from the power tool.

The problem that arises is one of keeping the rotating working element attached to the output shaft of the tool perpendicular to the pneumatic cylinder. Put differently, the output shaft has to be maintained parallel to the cylinder and normal to the surface of the workpiece. Typically, guide rails or some other form of guide structure are attached to the tool in an attempt to keep the output shaft of the tool perfectly parallel to the cylinder and normal to the workpiece surface. These normality problems become less of a problem in larger tools as larger carriage bearings or guide rails are normally used. However, with smaller tools, the moment that is produced due to the high thrust loads and the distance between the component secured to the output shaft of the tool, such as a cutter, and the cylinder providing the thrust force causes the cutter to twist, thus pushing the cutter out of its alignment parallel to the surface of the workpiece. In a reaming operation, this can cause the cutter to exceed a predetermined hole tolerance for holes being formed in the workpiece.

The guide rail system presently used to align and support power tools also requires exacting tolerances which are quite difficult to maintain. Up until the present time, this problem of maintaining the correct angularity of the tool relative to the pneumatic/hydraulic cylinder has required the use of larger bushings and/or guides, which causes the overall assembly to become much more cumbersome to handle and set up and to require much more space.

It would therefore be highly desirable to provide some form of apparatus which can be used to support a tool and to provide thrust forces evenly (i.e., concentrically) about the output shaft of the tool as the output shaft is guided toward a workpiece. This would eliminate the need for large, heavy and cumbersome guide rail systems and/or carriages and would ensure that the thrust forces acting on the output shaft are applied evenly about the output shaft, and thus also evenly about the working element attached to the output shaft. Such an apparatus would also provide a more compact means for supporting the tool and its working element.

SUMMARY OF THE INVENTION

The present invention is directed to a power feed apparatus for feeding a working element attached to an output shaft of a motor driven power tool in a linear motion relative to a workpiece. The present invention enables a thrust force to be applied evenly about a periphery of the output shaft, and thus evenly about the working element, to ensure that the working element remains parallel to a surface of the workpiece as the thrust force is applied.

In one preferred form, the apparatus comprises a first tubular member which is adapted to be fixed to a substructure associated with a workpiece such as a jig, carriage or other like structure. A second tubular member is provided and moves slidably relative to the first tubular member. The second tubular member supports the tool thereon and allows the output shaft of the tool to extend therethrough into the first tubular member. The first tubular member includes a first annular fluid chamber arranged concentrically around the output shaft. The second tubular member similarly includes a second annular fluid chamber formed concentrically with the output shaft. The first tubular member further includes a bore at one end for enabling the output shaft of the tool to extend therethrough and toward and/or into a workpiece.

In operation, when a pressurized fluid is injected into the first annular fluid chamber, this causes the second tubular member to move slidably linearly relative to the first tubular member. This causes the output shaft of the tool to be moved linearly from a retracted position into an extended position wherein the working element attached to the output shaft can be used to perform a machining operation, such as reaming, for example, on the workpiece. When the working element is to be retracted, a pressurized fluid is removed from the first annular fluid chamber and injected into the second annular fluid chamber. This causes the second tubular member to be moved slidably in an opposite direction such that the output shaft is retracted, thus withdrawing the working element from the workpiece.

In a preferred embodiment the first tubular member further includes a biasing member such as a coil spring for assisting in retracting the output shaft. The biasing member is disposed within a biasing member retaining tube disposed fixedly relative to the first tubular sleeve and concentrically therewith such that it is able to receive the output shaft therethrough.

The power feed apparatus of the present invention thus allows a pneumatic or hydraulic thrust force to be applied evenly and concentrically about an output shaft of the power tool. This allows the output shaft to be driven in a smooth, linear motion without creating any external forces which would tend to act on the working element to force it out of its perfectly parallel alignment with a work surface. Advantageously, the power feed apparatus of the present invention also forms a very compact assembly which can be secured readily to a jig or other supporting structure associated with the workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 2 is a simplified cross sectional side view of the apparatus of FIG. 1 taken in accordance with section line 2—2 in FIG. 1 showing the apparatus with an output shaft in a retracted position, and omitting the mounting structure shown in FIG. 1; and FIG. 3 is a view of the apparatus of FIG. 2 showing the output shaft in an extended position.

DETAILED DESCRIPTION OF THE PREFERRED EMBODIMENTS

Figure 1:
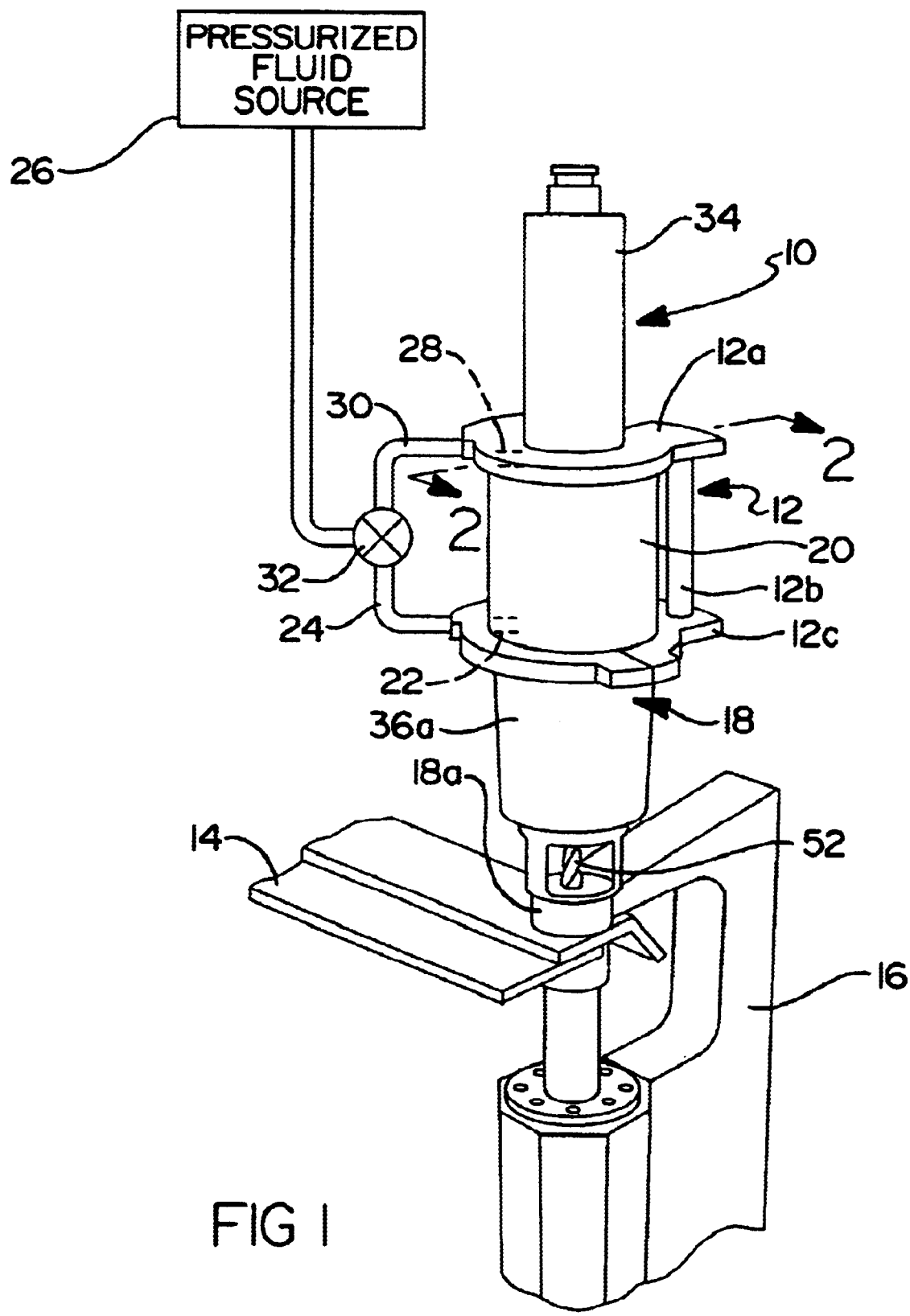
FIG. 1 is a perspective view of a power feed apparatus in accordance with a preferred embodiment of the present invention also showing a supporting structure for supporting the apparatus relative to a workpiece.

The following description of the preferred embodiment(s) is merely exemplary in nature and is in no way intended to limit the invention, its application, or uses.

Referring to FIG. 1, there is shown a power feed apparatus 10 in accordance with a preferred embodiment of the present invention. The apparatus 10 is illustrated as being supported by a guide shaft assembly 12 which is secured to the apparatus 10. The apparatus 10 is secured against a workpiece 14 by a clamp 16. As will be described in greater detail, the apparatus 10 can be secured to the workpiece 14 in a number of different ways, some of which do not include the requirement of a clamp 16.

The apparatus 10 generally includes a first tubular member 18 and a second tubular member 20 disposed concentrically with the first tubular member 18. The first tubular member 18 includes a port 22 which is coupled to a fluid line 24. The fluid line 24 is in communication with a pressurized fluid source 26 to thus allow pressurized fluid to be supplied into an interior area of the first tubular member 18. The second tubular member 20 includes a fluid port 28 which is in communication with a fluid line 30 which is also in communication with the pressurized fluid source 26. A suitable valve 32 can be used to direct fluid from the pressurized fluid source 26 into either the fluid port 22 or the fluid port 28. Alternatively, separate pressurized fluid sources could be employed for the two fluid ports 22 and 28.

The second tubular member 20 is adapted to fixedly support a tool 34. In one preferred form the tool comprises a drill having an electric motor. It will be appreciated, however, that other forms of tools, either electrically, hydraulically or pneumatically driven, having an output shaft could conceivably be carried by the apparatus 10.

In general operation, when pressurized fluid is applied via fluid line 24 into fluid port 22, this causes the second tubular member 20 to move linearly downwardly over first tubular member 18. Consequently, the output shaft of the motor 34 is urged linearly downwardly in the drawing of FIG. 1 into the workpiece 14. Typically the output shaft has coupled at an end a working element such as a reamer. Again, it will be appreciated that a wide variety of metal working devices could be employed in connection with the apparatus 10 and that the following description should not be limited to only a reamer.

A principal advantage of the apparatus 10 is that the thrust forces produced by the pressurized fluid are applied evenly and concentrically about the output shaft such that the output shaft is maintained perfectly perpendicular to the upper surface of the workpiece 14. This is in contrast to previously developed systems which employ a cylinder positioned off to one side of the tool, and which impart forces during the thrust motion that tend to urge the output shaft of the motor out of its perpendicular alignment to the surface of the workpiece 14.

Although the guide shaft assembly 12 is not considered to be a part of the apparatus 10, a brief description of its function will also be provided. The guide shaft assembly 12 includes a guide bracket 12a which is attached directly to the motor 34. The guide bracket 12a is in turn attached to an anti-rotation shaft 12b, which is in turn attached to a guide bracket 12c. Guide bracket 12c is fixedly secured to an outer surface 36a of the first tubular member 18. The components 12a, 12b and 12c cooperatively help to prevent rotation of the motor 34 relative to the first tubular member 18 as the motor 34 operates, while still allowing the second tubular member 20 to move down linearly over the first tubular member 18. A nosepiece 18a, integrally formed with the first tubular member 18, provides one means for allowing the first tubular member 18 to be fixedly secured via the clamp 16 to the work piece 14. Alternatively, the nosepiece 18a could be secured to a jig or other device associated with the work piece 14. Thus, it will be appreciated that various other schemes may be employed to support the apparatus 10 fixedly relative to a work piece.

Referring now to FIGS. 2 and 3, the internal components of the apparatus 10 will be described in greater detail. The first tubular member 18 includes a first or outer tubular sleeve 36 having the outer surface 36a mentioned in connection with the discussion of FIG. 1, a mounting component 38 and a biasing member retaining tube 40. It will be appreciated that for simplicity, the mounting component 38 is shown without the nosepiece 18a formed therewith.

Within the biasing member retaining tube 40 is disposed a biasing element, such as a coil spring 42. The fluid port 22 is formed by a flow path 44 created between a first wall portion 46 and a second wall portion 48 of the tubular sleeve 36. This flow path 44 leads into a first annular fluid chamber 50. It is important to note that the first annular fluid chamber 50 is disposed concentrically with a rotationally driven output shaft 52 of the motor 34. The biasing member 42 and the biasing member retaining tube 40 are also disposed concentrically with the output shaft 42. An annular pocket 54 is formed between the biasing member retaining tube 40 and an inner wall 56 of the tubular sleeve 36. The motor 34 and its output shaft 52 in this example form an electrically driven drill.

The tubular sleeve 18 is threadably secured to the mounting component 38. Similarly, the biasing member retaining tube 40 includes a lower threaded end 58 which is secured within a threaded bore 60 of the mounting component 38. The mounting component 38 includes a central bore 62 for allowing the output shaft 52 to extend therethrough toward the workpiece 14. (not shown in FIG. 2). A lower bearing pack 60a and an associated seal 60b are also disposed within the threaded bore 60 internal to the biasing member retaining tube 40. Optionally, the mounting component 38 may include a lower threaded end 64 which may be threadably engaged with a threaded bore in a jig or other like structure to support the apparatus 10 fixedly relative to the jig or like structure.

With continuing reference to FIG. 2, the second tubular member 20 includes an outer tubular sleeve 66 and an inner tubular sleeve 68. The outer tubular sleeve 66 includes a fluid flow passageway 70 in communication with the fluid port 28. Fluid passageway 70 communicates with an annular fluid chamber 72 which is arranged concentrically with the output shaft 52. The annular fluid chamber 72 is formed between an outer surface 74 of the inner tubular sleeve 68 and an inner surface 76 of the outer tubular sleeve 66. An upper end portion 78 of the inner tubular sleeve 68 is threadably engaged with an upper mounting component 80, which is in turn threadably engaged with a threaded portion (not shown) of a housing of the motor 34. The outer tubular sleeve 66 is threaded onto the upper mounting component 80 at the threaded bore 82. In this particular embodiment, the second tubular member 20 provides a micrometer depth stop and a hard stop for the first tubular member 18 as it slides into the second tubular member 20. The micrometer depth is held systematically by a locknut 97. Within the upper mounting component 80 is disposed an upper bearing pack 81a and an associated seal 81b. Bearing packs 81a and 60a help to maintain the output shaft 52 concentric within the first and second tubular members 18 and 20.

Referring further to FIG. 2, a first O-ring seal 84 provides a seal between the outer surface of the inner tubular sleeve 68 at its upper end and an inner surface of the outer tubular sleeve 66. A second O-ring seal 86 provides a seal between the outer surface of the inner tubular sleeve 68 and an inner surface of the outer tubular sleeve 36. A third O-ring seal 88 disposed between a lower outer edge 89 of the inner tubular sleeve 68 and the inner wall 56 of the outer tubular sleeve 36 provides a seal at this area. O-ring seals 84 and 86 thus seal off the annular fluid chamber 72 when a pressurized fluid is injected therein. O-ring seals 86 and 88 serve to seal off the annular flow chamber 50 when a pressurized fluid is injected thereinto.

With further reference to FIG. 2, guide element 80 includes a main body portion 90 having a lower end with a flange 92. The main body portion 90 extends through an opening 93 in a guide element 94 and into contact with the biasing member 42. The flange 92 has diameter which allows it to be inserted within the biasing member retaining tube 40 and to move slidably up and down within tube 40 as the output shaft 52 is moved between extended and retracted positions.

Turning now to the operation of the apparatus 10, when a pressurized fluid is applied to port 22, this causes the annular fluid chamber 50 to be filled with the pressurized fluid. This causes the inner tubular sleeve 68 of the second tubular member 20 to be driven downwardly in the drawing of FIG. 2 into the position shown in FIG. 3. Importantly, the thrust force that the pressurized fluid provides is distributed evenly and concentrically about the output shaft 52. Thus, there are no external forces applied to the output shaft 52 which tend to urge it off center of an axis extending perfectly perpendicular to an upper surface of the workpiece 14. The force of the pressurized fluid compresses the biasing element 42 as the guide member 80 is driven downwardly together with the inner tubular sleeve 68. It will be appreciated that during this movement of the output shaft 52 into an extended position, that the fluid port 28 needs to be free to expel fluid collected in the annular fluid chamber 72 through the fluid passageway 70. Also, optionally, a flow control device could be employed at fluid port 28 to control the downward thrust and/or speed of the output shaft 52. Extending movement of the second tubular members 20 is limited by engagement of a top surface 98 of first tubular member 18 that abuts a flange 99 of the outer tubular sleeve 66.

As the second tubular member 20 moves downwardly in the drawing of FIG. 2, the outer tubular sleeve 66 and the tubular sleeve 68 are guided by the outer tubular sleeve 36 of the first tubular member 18. This helps to ensure that the guide member 80 remains perfectly concentric with the longitudinal axis of the output shaft 52. The apparatus 10 is shown with the output shaft 52 in its fully extended position in FIG. 3.

When the output shaft 52 is to be retracted (i.e., moved back into the position shown in FIG. 2), the fluid pressure applied to port 22 is removed, thereby allowing fluid collected within the annular fluid chamber 50 to be expelled out through the flow path 44 and the port 22. This occurs simultaneously as a pressurized fluid is directed into port 28, through flow paths 70 and into the annular flow chamber 72. The fluid entering annular flow chamber 72 acts on the second outer tubular sleeve 66 to urge the sleeve 66 upwardly in the drawing of FIG. 2. The biasing member 42 also assists in urging the entire second tubular member 20 upwardly away from the first tubular member 18. It will be appreciated that in some applications the biasing member 42 by itself may be sufficient to provide the needed retracting force.

The apparatus 10 of the present invention thus provides a simple, very compact means for applying thrust forces to an output shaft of a tool in a manner which does not tend to force the output shaft out of perfect perpendicular alignment with the outer surface of a workpiece. Since the apparatus 10 does not require any external carriage or guide rail system, it forms a much more compact system which can be handled, set up and used much more easily and conveniently on various types of workpieces. In particular, the invention is ideally suited to aircraft manufacturing operations where high precision drilling and reaming operations are employed to form very precise diameter holes in various size and shaped components.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A power feed apparatus for feeding a working element attached to an output shaft of a power tool in a linear motion relative to a workpiece so as to distribute a thrust force applied to said output shaft evenly concentrically about said output shaft, said apparatus comprising;
    a first tubular member adapted to be coupled to a substructure associated with said workpiece, said first tubular member having a first fluid port;
    a second tubular member adapted to move slidably relative to said first tubular member, said second tubular member being adapted to support said output shaft of said motor concentrically relative to said first tubular member;
    surfaces of said tubular members defining a first fluid chamber therebetween arranged concentrically about said output shaft; and
    wherein fluid pressure from a fluid source directed into said fluid chamber operates to urge said second tubular member, and thus said output shaft, linearly relative to said first tubular member into an extended position and to distribute a thrust force evenly concentrically about said output shaft.

2. The apparatus of claim 1, wherein said tubular members define a second fluid chamber independent of said first fluid chamber and a second fluid port in communication with said second fluid chamber; and
    wherein a pressurized fluid admitted into said second fluid chamber causes linear movement of said second tubular member, and thus said output shaft, from said extended position to a retracted position.

3. The apparatus of claim 1, wherein said first tubular member comprises a biasing element for applying a force to said second tubular member to urge said second tubular member from said extended position into a retracted position when said fluid pressure is removed from said first fluid port.

4. The apparatus of claim 1, wherein said second tubular member comprises an outer tubular sleeve and an inner tubular sleeve disposed concentrically within said outer tubular sleeve, for guiding said second tubular member slidably relative to said first tubular member.

5. The apparatus of claim 1, wherein said first tubular member comprises an outer sleeve and an inner sleeve disposed concentrically within said outer sleeve to define an annular area therebetween for guiding a portion of said second tubular member.

6. The apparatus of claim 1, wherein said first tubular member comprises a mounting component adapted for coupling to said substructure, said mounting component having a bore for permitting linear movement of said output shaft therethrough.

7. A power feed apparatus for feeding an output shaft of a power tool in a linear motion relative to a workpiece without impeding rotational movement of said output shaft, and in a manner which distributes thrust forces imparted to said output shaft evenly concentrically about said output shaft while said output shaft is moved linearly between a retracted position and an extended position, said apparatus comprising:
  a first tubular member including an outer sleeve and an inner tube defining an annular area therebetween, said first tubular member adapted to be fixedly secured to a substructure associated with said workpiece;
  a second tubular member including a second outer tubular sleeve and a second inner tubular sleeve disposed concentrically within said second outer sleeve, said output shaft being supported from said second tubular member and extending concentrically through said second inner tubular sleeve and said inner tube;
  said outer sleeve and said inner tube defining a first annular area therebetween in which a portion of said second inner tubular sleeve travels during movement of said second tubular member; and
  a first annular fluid chamber formed between said second inner tubular sleeve and said outer sleeve such that a pressurized fluid admitted into said first fluid chamber causes linear movement of said output shaft from said retracted position to said extended position.

8. The apparatus of claim 7, wherein said second outer tubular sleeve and said second inner tubular sleeve form a second annular fluid chamber therebetween such that said pressurized fluid injected into said second annular fluid chamber, while said first annular fluid chamber is not pressurized with said pressurized fluid, causes movement of said second tubular member, and thus said output shaft, from said extended position to said retracted position.

9. The apparatus of claim 7, wherein said first tubular member includes a mounting component for enabling said apparatus to be fixedly secured to said substructure associated with said workpiece.

10. The power feed apparatus of claim 9, further comprising a bearing assembly disposed in said mounting component for helping to maintain said output shaft concentrically within said first tubular member.

11. The apparatus of claim 7, further comprising at least one O-ring seal disposed between said outer sleeve and said inner tube.

12. The apparatus of claim 7, wherein:
  said inner tube comprises a biasing member retaining tube disposed fixedly concentrically with said outer sleeve; and
  said second tubular member includes an output shaft guide tube disposed concentrically within said second outer tubular sleeve;
  wherein said apparatus further includes a biasing member disposed within said biasing member retaining tube; and
  wherein said biasing member acts on said output shaft guide tube to assist in retracting said output shaft when said fluid pressure is removed from said second annular fluid chamber.

13. The power feed apparatus of claim 7, further comprising a bearing assembly mounted in said second tubular member for helping to maintain said output shaft concentrically within said second tubular member.

14. A method for feeding an output shaft of a power tool in a linear motion relative to a workpiece without impeding rotational movement of said output shaft, and in a manner which distributes thrust forces imparted to said output shaft evenly concentrically about said output shaft while said output shaft is moved linearly between a retracted position and an extended position, relative to a workpiece, the method comprising:
  providing a first tubular member which is adapted to be fixedly attached to a substructure associated with said workpiece, and which includes a bore for permitting said output shaft to extend therethrough into said workpiece;
  providing a second tubular member having a diameter sufficiently large to permit sliding movement over said first tubular member, said second tubular member including a portion arranged to extend within an interior area of said first tubular member, said second tubular member supporting a motor thereon for driving said output shaft, and said working element being aligned concentrically with said bore in said first tubular member;
  forming a first annular fluid chamber within said first tubular member for causing said second tubular member to be urged linearly toward said first tubular member when a pressurized fluid is injected into said first annular fluid chamber, thereby causing said output shaft to be extended from said first tubular member toward said workpiece; and
  forming a second annular fluid chamber within said second tubular member for causing said second tubular member to be retracted away from said workpiece when a pressurized fluid is injected into said second annular fluid chamber.

15. The method of claim 14, further comprising using a spring disposed within one of said first or second tubular members to assist in retracting said output shaft.

16. A method for feeding a output shaft of a power tool in a linear motion relative to a workpiece without impeding rotational movement of said output shaft, and in a manner which distributes thrust forces imparted to said output shaft evenly concentrically about said output shaft while said output shaft is moved linearly between a retracted position and an extended position relative to a workpiece, the method comprising:
  providing a first tubular member which is adapted to be fixedly attached to a substructure associated with said workpiece, and which includes a bore for permitting said output shaft to extend therethrough into said workpiece;
  providing a second tubular member having a diameter sufficiently large to permit sliding movement over said first tubular member, said second tubular member including a portion arranged to extend within an interior area of said first tubular member, said second tubular member supporting a motor thereon for driving said output shaft, and said output shaft being aligned concentrically with said bore in said first tubular member;

forming a first annular fluid chamber within said first tubular member for causing said second tubular member to be urged linearly toward said first tubular member when a pressurized fluid is injected into said first annular fluid chamber, thereby causing said output shaft to be extended from said first tubular member toward said workpiece; and using a biasing element disposed within one of said first and second tubular members to retract said output shaft.

17. The method of claim 16, further comprising:

forming a second annular fluid chamber within said second tubular member for retracting said output shaft when a pressurized fluid is applied to said second annular fluid chamber.

* * * * *